July 14, 1931.  J. J. ZINSLEN  1,814,882
TOOL HOLDER
Filed Nov. 6, 1929
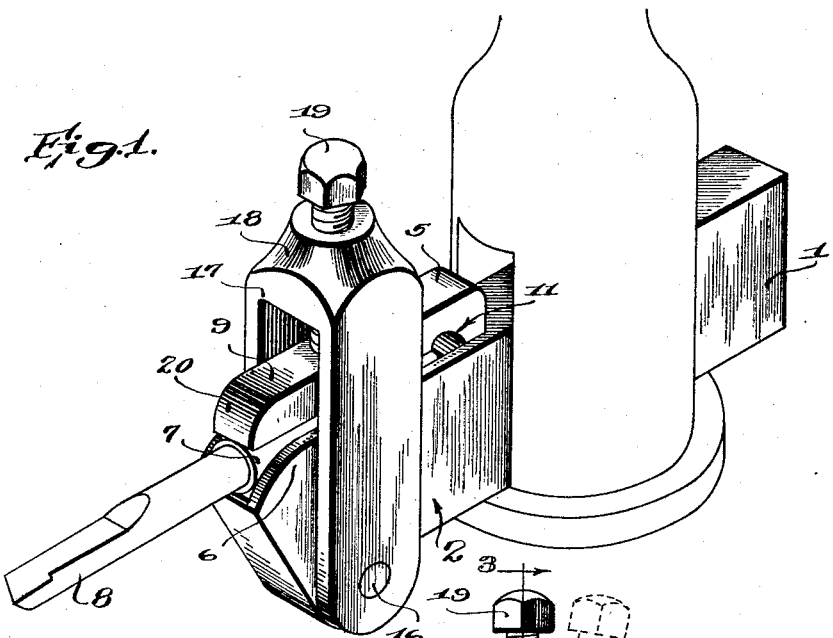
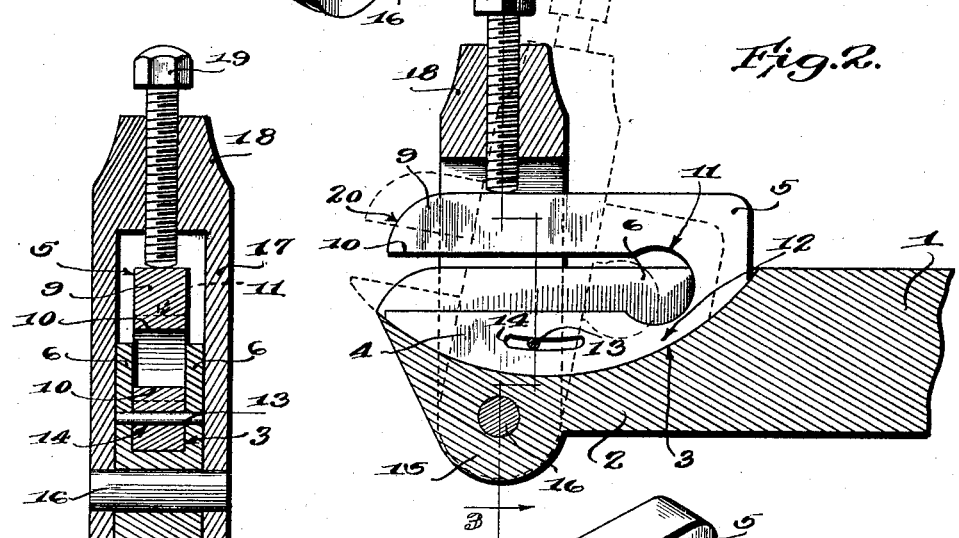
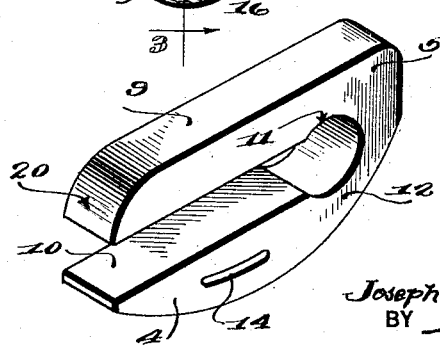
WITNESSES
INVENTOR
Joseph J. Zinslen
BY
ATTORNEY Patented July 14, 1931

1,814,882

UNITED STATES PATENT OFFICE

JOSEPH J. ZINSLEN, OF CANTON, OHIO

TOOL HOLDER

Application filed November 6, 1929. Serial No. 405,235.

This invention relates to improvements in tool holders and it consists of the constructions, combinations and arrangements herein described and claimed.

An object of the invention is to provide a tool holder which will not only firmly grip a round shank with equal facility to a square shank, but will do so in a large variety of positions of the tool in respect to the support member or bar.

Another object of the invention is to provide a tool holder arranged to grip substantially the length of the shank of a tool and by virtue of the bit holder by which the gripping is done, is enabled to grip short pieces of the tool in case the latter has become broken and no new tool is available.

A further object of the invention is to impart the grip to the tool shank through the medium of a loose fork or bit holder, thus avoiding contact of the compression screw with the tool shank and minimizing the likelihood of breakage by setting up undue stresses at a particular point.

A still further object of the invention is to equip the bit holder with a stop slot and pin for the purpose of preventing the holder from falling out of its recess in the support bar in any position.

Other objects and advantages will appear in the following specification, reference being had to the accompanying drawings, in which:

Figure 1 is a perspective view of the improved tool holder illustrating its application to a familiar tool post.

Fig. 2 is a detail longitudinal section of a portion of the improved tool holder, the loose fork or bit holder being shown in elevation.

Fig. 3 is a vertical section taken on the line 3—3 of Fig. 2.

Fig. 4 is a perspective view of the bit holder.

The improved tool holder comprises a support member or bar 1 which is of an elongated form and of rectangular cross section at all points excepting the working end herein designated the head 2. This head has a clamp recess 3 with an arcuate bottom (Fig. 2) to conform to the lower component 4 of a bit holder 5. The recess 3 is narrower than the bar 1 is thick (Figs. 1 and 3), thus leaving side walls 6 against which the bit holder 5 has adequate bearing.

These side walls also perform the important function of aiding in the retention or clamping of the shank 7 of a tool 8 (Fig. 1), especially if the shank be round, as illustrated. The holding function is thus not confined to the bit holder 5 but the side walls 6 are made to contribute to that purpose.

The bit holder 5 comprises a loose fork. The lower jaw component 4 has a companion jaw 9 which, unlike the lower component 4, is level on top. The jaws 4 and 9 are formed by slotting the bit holder 5 at 10. The sides of the slot are parallel, and it is in the slot that the shank 7 is inserted. A circular terminal 11 enlarges the slot at the closed end, and by virtue of its relationship to the rest of the bit holder 5, produces a resilient or spring shank 12 at which any necessary flexing of the bit holder occurs.

It will be understood by a comparison of the full and dotted line positions in Fig. 2 that the bit holder 5 is intended to ride or be slid back and forth in the recess 3 in order to accomplish the intended adjustment of the tool 8. In this respect, the bit holder constitutes a loose fork. It is adjustable with the utmost freedom, but in order to prevent the bit holder from ever falling out of the recess 3, the bar 1 is provided with a pin 13 which occupies a stop slot 14 extending transversely of the component 4 of the bit holder. This slot conforms to the shape of the recess 3. In addition to retaining the bit holder the slot limits the front and back adjustments of the bit holder.

A boss or enlargement 15 on the under side of the bar 1 provides an adequate bearing for a pin 16 upon which a clamp yoke 17 is hinged. This yoke straddles the sides of the head 2, as plainly illustrated. By virtue of its relationship to the head 2 the clamp yoke exercises a reinforcing function in respect to the side walls 6. Should there ever be any tendency toward the side walls 6 spreading outwardly, as by force of some severe clamping action, the adjoining straps of the yoke 17 would defeat any tendency toward yielding and thus make the clamping function all the more secure.

This yoke terminates in a relatively heavy head 18 which furnishes a firm bearing for a pressure screw 19. It is by means of this screw that the clamping pressure is applied to the bit holder 5 and, in turn, to the shank 7 of the tool. By confining the point of contact of the pressure screw to the bit holder and avoiding such contact with the shank of the tool, the likelihood of breakage of the shank from this cause is obviated. In instances where the pressure is directed against the shank, there will not only be a marring of the surface, but the metal will be weakened at the point of contact so that breakage will be more easy and the period of usefulness of the tool terminated earlier than it should be.

In this respect, it is of utmost importance to observe that in addition to performing the important purpose of gripping substantially the full length of the tool shank 7, the bit holder 5 is adapted to grip short pieces of tools that have been damaged and broken possibly from the very cause just recited. It often happens that a mechanic will have broken ends of twist drills which, in many instances, might be used if they could be gripped firmly enough in a chuck.

Generally it is a difficult matter to secure the twist end of a drill bit in a three-jaw chuck, but by utilizing the improved tool holder as a bit chuck, the purpose will be admirably served because of the peculiar quality of the bit holder 5. The broken end can be inserted in the slot 10 where said end will not only be gripped by the top and bottom of the slot but will be held by the side walls 6 as well. The four-point contact will accurately center the bit end and prevent any wobbling when it is subsequently used for the drilling purpose.

Another important feature is now to be observed. This has reference to the relationship of the yoke 17 to the bit holder 5. The axis of the pressure screw 19 can be made perpendicular to the level top of the bit holder 5 throughout the range of adjustment of the bit holder. In other words, this facility provides for a direct application of the pressure to the bit holder. The shank 7 will thus be directly gripped in any adjustment of the bit holder, and the gripping pressure will be transverse to the major axis of the shank 7.

By consulting Fig. 2 for a moment, it will be understood at once that the curved bottom of the recess 3 is a factor that contributes largely to the foregoing purpose of directly gripping the tool shank. Regardless of what the permissible adjustment of the bit holder 5 is, the clamp yoke 17 can always be swung over to a position of perpendicularity with the level top of the bit holder and the pressure of the screw 19 will be transmitted directly to the arcuate bottom of the recess. Thus, in a sense, the bottom 3, although arcuate, will constitute a firm pressure base for any adjustment of the bit holder 5.

In further reference to the bit holder 5, it is observed that the member 9 has a rounded nose 20. There is a purpose in thus rounding the nose. It might be desired at times to swing the yoke 17 forwardly and downwardly to a position entirely clear of the bit holder 5. Compactness and sturdiness demand that the clamp yoke 17 shall be made as short as possible. With an established arrangement such as this, it would be impossible for the rear edge of the yoke to clear the member 9 were the nose not rounded as at 20. It is conceivable that metallic filings or other foreign matter might accumulate in the recess 3 around the bit holder 5. The work of clearing such obstructions out can be greatly facilitated by swinging the clamp yoke 17 forwardly as stated.

The operation is readily understood. In working metal it is necessary to tilt the tool 8 at various angles to suit the particular characteristics of various metals. Any needed adjustment can be made by simply backing out the screw 19 sufficiently far to enable setting the bit holder 5 to the desired position (Fig. 2).

The yoke 17 will be tilted to conform with the setting of the bit holder. The idea is to keep the clamp yoke perpendicular to the level top of the member 9. The pressure of the screw 19 may thus be applied in a direction perpendicular to the major axis of the tool. Were the pressure applied otherwise, there would always be the danger of the tool slipping. For example, if the pressure were applied from one side or at an angle other than a right angle to the major axis of the tool, there would be the constant danger of some readjustment of the setting during the use of the tool, resulting in a loosening up that would obviously be undesirable.

It has been stressed how the side walls 6 aid in the clamping of the shank, especially if the shank be round. A round shank is hard to hold and it usually requires a chuck with three or more jaws to hold a tool with a round shank. The effect of the parallel slot 10 and the parallel sides 6 (Fig. 3) is that of a four-jaw chuck. The shank will be pressed on four sides and will not only be firmly clamped against rolling, but will be alined with the major axis of the tool holder itself. The pressure exerted by the screw 19 will cause the necessary bending of the bit holder 5 at the resilient shank 12. The bit holder thus constitutes a resilient fork, and, as already pointed out, it is perfectly loose, always capable of being set to any adjustment within the limits of the stop slot 14.

While the construction and arrangement of the improved tool holder is that of a generally preferred form, obviously modifications and changes may be made without departing from the spirit of the invention and the scope of the claims.

I claim:—

1. A tool holder comprising a support bar having a recess with an arcuate bottom and side walls, a holder member to fit in the recess being slotted to receive a tool shank and comprising jaw components respectively level on top and arranged underneath to conform to the recess, a yoke hinged to the bar, straddling the side walls and holder member and adjustable to maintain a position perpendicular with said level top at any arcuate adjustment of the holder member, and a compression screw carried by said yoke to bear upon said level top and apply pressure in a direction perpendicular to the major axis of a tool held by the holder.

2. A tool holder comprising a support bar having a recess with a curved bottom and a side wall, a clamp fork fitted in the recess, also curved to match said bottom and having a curved slot struck from the same center as said bottom, and a pin fixed on the wall to enter the slot.

3. A tool holder comprising a support bar having a recess with a curved bottom and a side wall, a clamp fork fitted in the recess, also curved to match said bottom and having a curved slot struck from the same center as said bottom, a pin fixed on the wall to enter the slot, a yoke hinged on the support bar and straddling the fork to assist in keeping it in place, and a screw carried by the yoke to press on the fork.

JOSEPH J. ZINSLEN.